US 8,424,061 B2

Apr. 16, 2013

(12) United States Patent
Rosenoer

(10) Patent No.: US 8,424,061 B2
(45) Date of Patent: Apr. 16, 2013

(54) METHOD, SYSTEM AND PROGRAM PRODUCT FOR AUTHENTICATING A USER SEEKING TO PERFORM AN ELECTRONIC SERVICE REQUEST

(75) Inventor: Jonathan M. C. Rosenoer, Saint Helena, CA (US)

(73) Assignee: International Business Machines Corporation, Armonk, NY (US)

(*) Notice: Subject to any disclaimer, the term of this patent is extended or adjusted under 35 U.S.C. 154(b) by 1304 days.

(21) Appl. No.: 11/519,746

(22) Filed: Sep. 12, 2006

(65) Prior Publication Data
US 2008/0066165 A1    Mar. 13, 2008

(51) Int. Cl.
*G06F 21/00* (2006.01)

(52) U.S. Cl.
USPC .......... 726/4; 726/2; 726/5; 726/25; 713/166; 713/168; 380/241; 455/414.1; 705/69; 709/219

(58) Field of Classification Search ...... 726/4, 165–166; 705/38
See application file for complete search history.

(56) References Cited

U.S. PATENT DOCUMENTS

| | | | | |
|---|---|---|---|---|
| 6,177,940 | B1 * | 1/2001 | Bond et al. | 434/262 |
| 6,263,447 | B1 * | 7/2001 | French et al. | 726/5 |
| 6,496,936 | B1 * | 12/2002 | French et al. | 726/7 |
| 7,237,267 | B2 * | 6/2007 | Rayes et al. | 726/25 |
| 7,389,275 | B2 * | 6/2008 | Kemper et al. | 705/64 |
| 7,433,829 | B2 * | 10/2008 | Borgia et al. | 705/7 |
| 7,499,888 | B1 * | 3/2009 | Tu et al. | 705/44 |
| 2001/0056398 | A1 * | 12/2001 | Scheirer | 705/38 |
| 2003/0069821 | A1 * | 4/2003 | Williams | 705/36 |
| 2003/0115142 | A1 * | 6/2003 | Brickell et al. | 705/51 |
| 2003/0154393 | A1 * | 8/2003 | Young | 713/200 |
| 2003/0163739 | A1 | 8/2003 | Armington et al. | |
| 2004/0073810 | A1 * | 4/2004 | Dettinger et al. | 713/201 |

(Continued)

FOREIGN PATENT DOCUMENTS

| | | |
|---|---|---|
| WO | WO 00/78009 A2 | 12/2000 |
| WO | WO 03/075540 A2 | 9/2003 |

(Continued)

OTHER PUBLICATIONS

Rust et al., "E-Service: A New Paradigm for Business in the Electronic Environment", Communications of the ACM Jun. 2003/vol. 46, No. 6, pp. 37-42.*

(Continued)

*Primary Examiner* — Morshed Mehedi
(74) *Attorney, Agent, or Firm* — John R. Pivnichny; Law Office of Jim Boice

(57) ABSTRACT

A method, system and program product for authenticating a user seeking to perform an electronic service request is provided. The method includes verifying user identity data received from a user requesting an electronic service, detecting whether or not any variances are found based on the set of user profile data associated with the user seeking to perform the electronic service requested, identifying the risk level for the electronic service based on whether or not any variances are found and any characteristics thereof, if any variances are found, applying one or more business policies or rules for handling any variances that are found. The method further includes issuing to the user, using a customer relationship management system, a challenge corresponding to the risk level identified for the electronic service requested, and authorizing the user to perform the electronic service requested only if a correct response is received to the challenge issued.

22 Claims, 12 Drawing Sheets

U.S. PATENT DOCUMENTS

| | | | |
|---|---|---|---|
| 2004/0078324 A1* | 4/2004 | Lonnberg et al. | 705/39 |
| 2004/0187018 A1 | 9/2004 | Owen et al. | |
| 2005/0033702 A1 | 2/2005 | Holdsworth | |
| 2005/0097320 A1* | 5/2005 | Golan et al. | 713/166 |
| 2005/0228993 A1 | 10/2005 | Silvester et al. | |
| 2005/0246278 A1* | 11/2005 | Gerber et al. | 705/44 |
| 2005/0268100 A1 | 12/2005 | Gasparini et al. | |
| 2005/0269401 A1 | 12/2005 | Spitzer et al. | |
| 2006/0156385 A1* | 7/2006 | Chiviendacz et al. | 726/2 |
| 2006/0161435 A1* | 7/2006 | Atef et al. | 704/246 |
| 2007/0061248 A1* | 3/2007 | Shavit et al. | 705/37 |
| 2008/0005037 A1* | 1/2008 | Hammad et al. | 705/67 |

FOREIGN PATENT DOCUMENTS

| | | |
|---|---|---|
| WO | WO 03/075540 A3 | 9/2003 |
| WO | 2005/025292 A2 | 3/2005 |
| WO | WO 2005025292 A2 * | 3/2005 |

OTHER PUBLICATIONS

Zhang, N. et al., "Towards an Authentication Middleware to Support Ubiquitous Web Access", Proceedings—International Computer Software and Applications Conference, Sep. 28-20 2004, pp. 36-38, USA.

* cited by examiner

METHOD, SYSTEM AND PROGRAM PRODUCT FOR AUTHENTICATING A USER SEEKING TO PERFORM AN ELECTRONIC SERVICE REQUEST

FIELD OF THE INVENTION

The present invention relates to the field of authentication systems and, more particularly, the invention relates to a method, system and computer program product for authenticating a user seeking access to perform an electronic service request or an electronic transaction using a customer relationship management (CRM) system.

BACKGROUND OF THE INVENTION

In today's business environment, customers are increasingly conducting online or electronic transactions with organizations and/or businesses, such as retailers, banking services, etc. In a typical scenario, a customer seeking to conduct an online transaction, accesses a business' web page via the Internet and then may have to supply personal information depending on the type of online transaction. For instance, if purchasing an item online, the customer typically has to provide personal information that identifies the customer, such as, name, address, a credit card number, etc. Invariably, such online transactions can lead to fraud. As such, there is a need for a business and/or organization to provide a cost-effective way to strengthen their ability to verify that the online customer is in fact who the customer claims to be without burdening the customer with having to remember too many passwords, or carry devices, etc.

SUMMARY OF THE INVENTION

In a first aspect of the invention, there is provided a method for authenticating a user seeking to perform at least one electronic service request. The method comprises verifying user identity data received from a user requesting at least one electronic service, identifying a risk level for at least one electronic service requested by the user, the risk level identified being based on a set of user profile data associated with the user, issuing to the user, using a customer relationship management system, at least one challenge corresponding to the risk level identified for at least one electronic service requested, and authorizing at least one electronic service requested only if a correct response is received to at least one challenge issued. In an embodiment, the verifying step comprises receiving the user identity data comprising a username and a password, and authenticating the user identity data received using an authentication engine. In an embodiment, the identifying step further comprises detecting whether or not any variances are found based on the set of user profile data associated with the user seeking to perform at least one electronic service requested, and identifying the risk level for at least one electronic service based on whether or not any variances are found and any characteristics thereof. In an embodiment, the detecting step further comprises applying, if any variances are found, one or more rules, using a business rules engine, for handling any variances that are found, such that at least any first challenge issued corresponds to the risk level identified for the at least one electronic service requested. The method further comprises monitoring any additional electronic service requested by the user, issuing to the user another challenge based on any additional electronic service requested, the another challenge corresponding to a risk level identified for any additional electronic service requested, and authorizing the user to conduct any additional electronic service requested only if a correct response is received to the another challenge. In an embodiment, the one challenge issued and the another challenge issued each comprises at least one of: a static challenge and a dynamic challenge. In an embodiment, the static challenge is a challenge that is predetermined by the user, and wherein the dynamic challenge is a challenge generated by the customer relationship management system. In an embodiment, the static challenge corresponds to a relatively low risk level identified for at least one electronic service requested, and wherein the dynamic challenge corresponds to a relatively high risk level identified for at least one electronic service requested.

In another aspect of the invention, there is provided a system for authorizing a user to execute one or more electronic service requests. The system comprises an authentication module configured to authenticate user identity data received from a user seeking access to a host for executing one or more electronic service requests, the authentication module being configured to grant access to the host upon authentication of the user identity data, a fraud detection module configured to monitor each electronic service request of the one or more electronic service requests received from the user having access granted to the host, and the fraud detection module being configured to identify a risk level for the each electronic service request received from the user and to generate a challenge for the each electronic service request received from the user, the challenge corresponding to the risk level identified and corresponding to any associated business policies that may apply, such that the challenge generated is issued to the user by the authentication module, which authorizes the user to perform the each electronic service request if a correct response is received to the challenge issued. In an embodiment, the fraud detection module is further configured to track a set of user data profile associated with the user and to generate the challenge for the each electronic service request received from the user based on the user data profile associated with the user, and wherein the fraud detection module is further configured to detect whether or not any variances exist, using the set of user profile data associated with the user and to identify the risk level for the each electronic service request received from the user taking into account whether or not any variances exist. In an embodiment, the authentication module further comprises a policy module configured to apply one or more business policies for handling the risk level associated with any variances detected. In an embodiment, the challenge issued is chosen from a challenge group comprises at least one of: a user-preset challenge group and a customer relationship management challenge group, wherein the user-preset challenge group comprises of one or more challenges that are preset by the user, and wherein the customer relationship management challenge group comprises of one or more challenges that are generated using a customer relationship management system. In an embodiment, as the risk level identified for the each electronic service requested increases, a level of strength of any resulting authorization associated with the challenge issued to the user for the each electronic service request received increases. In an embodiment, the challenge chosen from the user-preset challenge group corresponds to a relatively low risk level identified for the electronic service, and wherein the challenge chosen from the customer relationship management challenge group corresponds to a relatively high risk level identified for the electronic service.

In yet another aspect of the invention, there is provided a computer program product for authenticating a user. The computer program product comprises a computer readable medium, first program instructions to authenticate user identity data received from a user requesting an electronic service, the first program instructions including instructions to authorize the user upon authentication of the user identity data, second program instructions to track a set of user data profile associated with the user and to identify a risk level for the electronic service requested, the risk level being based on the set of user profile data associated with the user, third program instructions to issue a challenge to the user, the challenge corresponding to the risk level identified for the electronic service requested, the challenge being selected from either a static challenge group or a dynamic challenge group according to a business policy associated with the risk level identified, such that the user is authorized to conduct the electronic service if a correct response is received to the challenge issued for the electronic service. Preferably, the first, second and third program instructions are stored on the computer readable medium. In an embodiment, the first program instructions include instructions to receive the user identity data comprising a username and a password and to authenticate the user identity data. In an embodiment, the second program instructions include instructions to detect, using the set of user profile data associated with the user, whether or not any variances exist, and to identify the risk level for the electronic service requested by the user taking into account whether or not any variances exist and any characteristics thereof. Further, in an embodiment, if any variances exist, the second program instructions include instructions to apply one or more business policies for handling any variances that are found, such that the challenge issued to the user corresponds to the risk level identified for the electronic service requested. In an embodiment, the static challenge group comprises of one or more static challenges that are preset by the user, and wherein the dynamic challenge group comprises of one or more dynamic challenges that are generated using a customer relationship management system. In an embodiment, each of the one or more static challenges corresponds to a relatively low risk level identified for the electronic service, and wherein each of the one or more dynamic challenges corresponds to a relatively high risk level identified for at least one electronic service.

Further, in yet another aspect of the invention, there is provided a process for deploying computing infrastructure comprises integrating computer-readable code into a computing system, wherein the code in combination with the computing system is capable of performing a process for authenticating a user seeking access to a server for executing at least one electronic service. The process comprises authenticating user identity data received from a user seeking access to a host server to execute at least one electronic service, receiving a request from the user for at least one electronic service, issuing to the user at least a first challenge corresponding to at least one electronic service request received, at least first challenge being selected from either a user-preset challenge group or a customer relationship management challenge group, and authorizing at least one electronic service request if a correct response is received to at least first challenge issued. The issuing step further comprises checking a set of user profile data associated with the user, detecting whether or not any variances are found based on the set of user profile data associated with the user, and identifying a risk level for at least one electronic service request received based on whether or not any variances are found. In an embodiment, the detecting step further comprises applying, if any variances are found, one or more policies, using a business policies engine, for handling any variances that are found, such that at least the first challenge issued corresponds to the risk level identified for at least one electronic service request received in light of any variances found. In an embodiment, the user-preset challenge group comprises of one or more static challenges that are preset by the user, and wherein the customer relationship management challenge group comprises of one or more dynamic challenges that are generated using a customer relationship management system. In an embodiment, as the risk level identified for at least one electronic service request received increases, a level of complexity associated with the challenge issued to the user for at least one electronic service request received increases. In an embodiment, each of the static challenges corresponds to a relatively low risk level identified for at least one electronic service request received, and wherein each of the dynamic challenge corresponds to a relatively high risk level identified for at least one electronic service request received.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
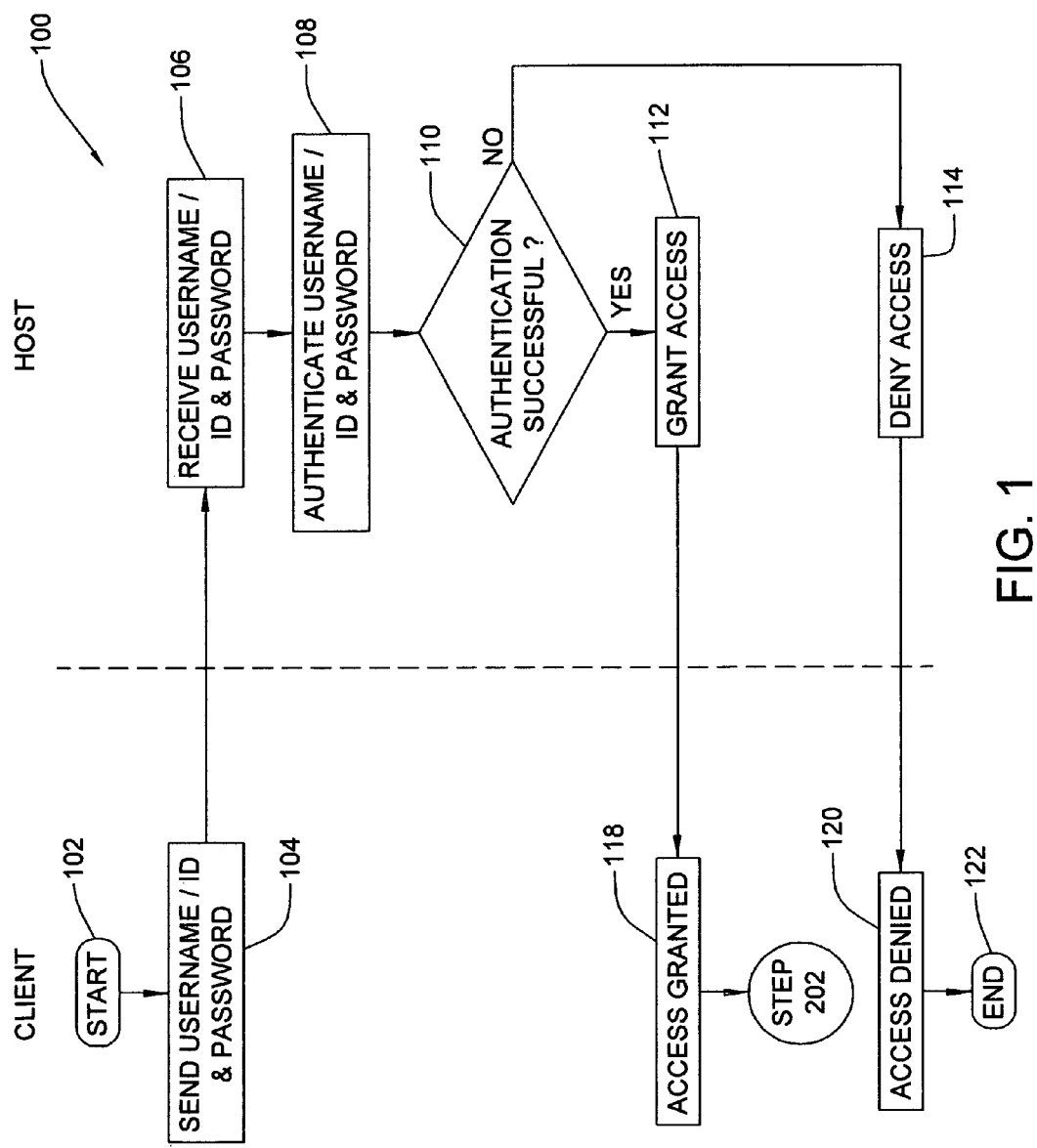
FIGS. 1-3 depict flowcharts which outline the steps involved in different aspects of authenticating a user seeking to access a host server or system, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In a first aspect of the invention, there is provided a method for authenticating a user seeking to perform at least one electronic service request. The method comprises verifying user identity data received from a user requesting at least one electronic service, identifying a risk level for at least one electronic service requested by the user, the risk level identified being based on a set of user profile data associated with the user, issuing to the user, using a customer relationship management system, at least one challenge corresponding to the risk level identified for at least one electronic service requested, and authorizing at least one electronic service requested only if a correct response is received to at least one challenge issued. In an embodiment, the verifying step comprises receiving the user identity data comprising a username and a password, and authenticating the user identity data received using an authentication engine. In an embodiment, the identifying step further comprises detecting whether or not any variances are found based on the set of user profile data associated with the user seeking to perform at least one electronic service requested, and identifying the risk level for at least one electronic service based on whether or not any variances are found and any characteristics thereof. In an embodiment, the detecting step further comprises applying, if any variances are found, one or more rules, using a business rules engine, for handling any variances that are found, such that at least any first challenge issued corresponds to the risk level identified for the at least one electronic service requested. The method further comprises monitoring any additional electronic service requested by the user, issuing to the user another challenge based on any additional electronic service requested, the another challenge corresponding to a risk level identified for any additional electronic service requested, and authorizing the user to conduct any additional electronic service requested only if a correct response is received to the another challenge. In an embodiment, the one challenge issued and the another challenge issued each comprises at least one of: a static challenge and a dynamic challenge. In an embodiment, the static challenge is a challenge that is predetermined by the user, and wherein the dynamic challenge is a challenge generated by the customer relationship management system. In an embodiment, the static challenge corresponds to a relatively low risk level identified for at least one electronic service requested, and wherein the dynamic challenge corresponds to a relatively high risk level identified for at least one electronic service requested.

Figure 2:
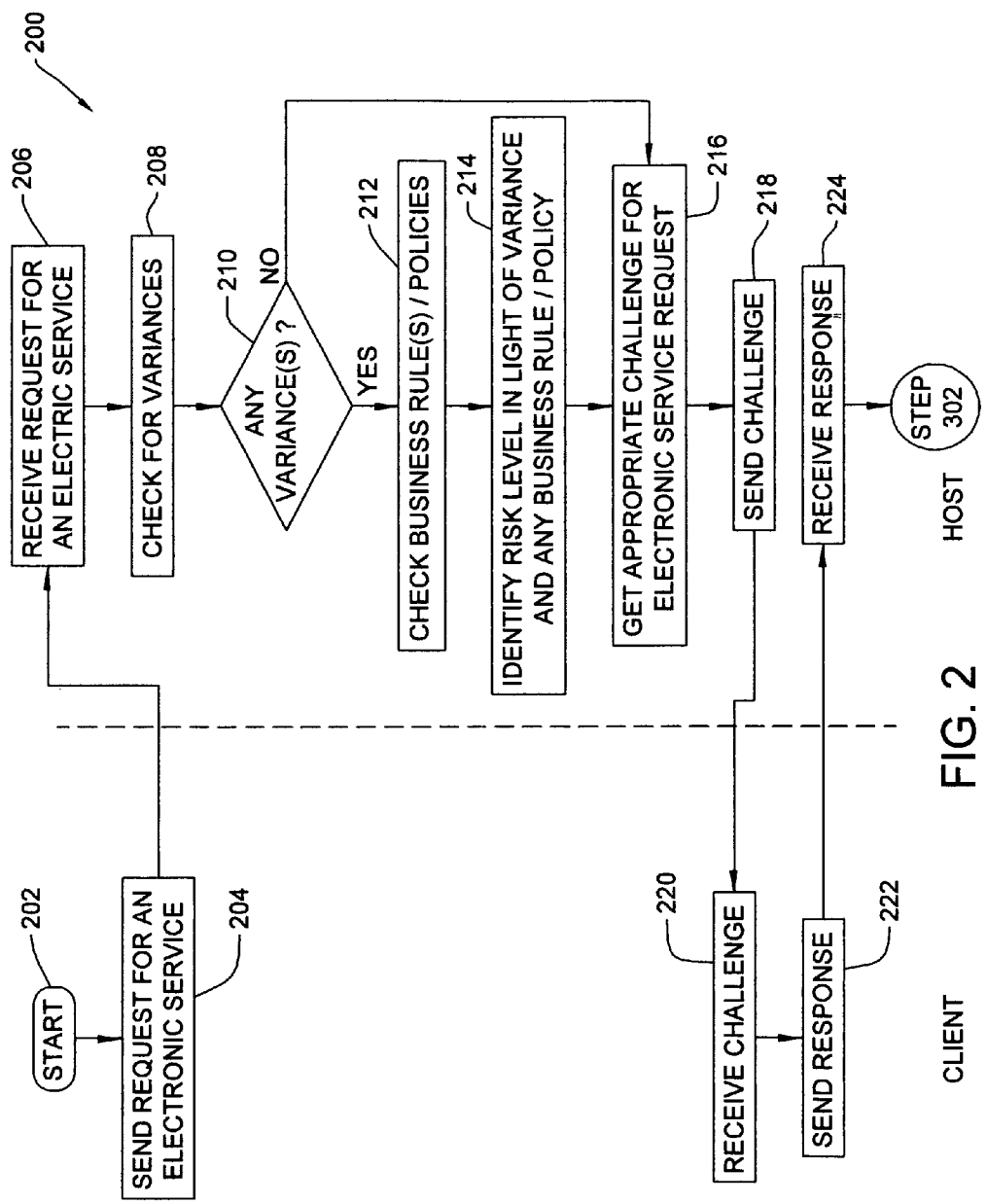
Figure 3:
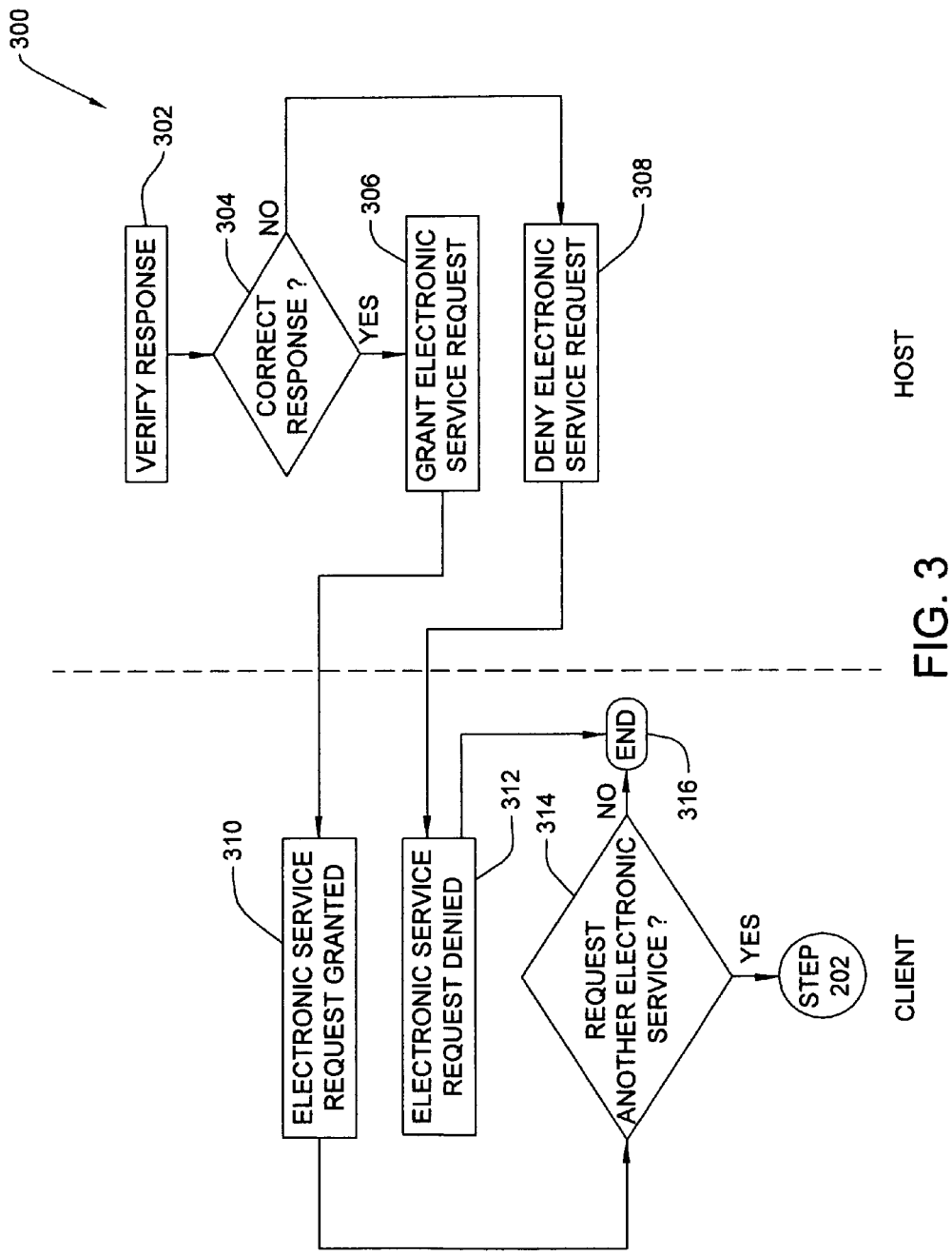

Reference is now made to FIGS. 1 through 3, which outline the steps involved in different aspects of authenticating a user seeking to access a host server or system (for example, a transaction server or system) and to perform an electronic service request, in accordance with an embodiment of the invention. Turning to FIG. 1, numeral 100 shows a flowchart that outlines the steps for authenticating a user seeking to perform at least one electronic service request. The method starts at 102 with the user at a client sending in step 104 a username or ID and password to a host in order to access the host (host is also referred to herein as a host server or host system). The host receives the username or ID and password in step 106 and further authenticates in step 108 the username or ID and password received from the client. In an embodiment, the host authenticates the username or ID and password using an authentication server, which determines whether or not the username or ID and password provided are correct and transmits or communicates the results back to the host. In step 110, the host determines whether or not the authentication was successful. If the authentication was not successful (the "N" branch), then the host denies access in step 114 by issuing an access denied message in step 120 to the client, thus, ending the process at step 122. However, if the authentication is successful (the "Y" branch) then the host grants access in step 112 by issuing a access granted message in step 118 to the client, continuing the process with step 202 in FIG. 2.

Turning to FIG. 2, reference numeral 200 outlines a method for authorizing a user seeking to perform at least one electronic service request, in accordance with an embodiment of the invention. Once the user at a client has been granted access in step 118 in FIG. 1, the method continues at step 202 with the user sending in step 204 a request for an electronic service. The host receives the request for an electronic service in step 206 and checks for any variances in step 208. In an embodiment, the host uses a fraud detection monitoring system or fraud/variance monitoring system for any variances. As used herein the term "variance" refers to any unusual pattern or behavior surrounding the user's activities, including the electronic service request itself. For instance, if the user is usually known to login to a system at a particular time from a particular location and if, for some reason the user is logging in from a different location and/or different time, the fraud/variance monitoring system would detect such a variance. Similarly, if the user is logging in from another country and/or requesting an unusual transaction, for instance, transferring large amounts of money from an equity line of credit to a checking account, the fraud/variance monitoring system would note such a variance. As such, the host determines using a fraud/variance monitoring system whether or not any variances have been found in step 210. If any variances are found ("Y" branch), then in step 212, the host checks for any existing business rules or policies that are applicable given the characteristics of the variance or variances that are found. In an embodiment, the host uses or accesses a business rules or policies engine or system to determine if there are any existing policies/rules on how to deal with any variances found. In step 214, the host identifies a risk level associated with the requested electronic service request in light of the variance(s) found and based upon any business rule or policy that may be applicable. In an embodiment, the host uses a fraud/variance monitoring system, which identifies a risk level based on whether or not any variance(s) are found and the characteristics of the variance(s) found. Going back to step 210, if no variances were found ("N" branch), or after step 214, the host gets in step 216 an appropriate challenge to present to the user for the requested electronic service request. The type of challenge issued to the user depends on the characteristics of any variances found, any business rules or policies that are applicable and based on an assessment of risk level for the electronic service requested. As such, a risk level associated with an electronic service request can be assessed as being a relatively low risk level to being a relatively high risk level. Moreover, the challenge issued corresponds to a risk level associated with the electronic service request and can be either a static challenge or a dynamic challenge, as will be explained herein below with respect to FIGS. 4 and 5. Referring back to FIG. 2, in step 218, the host sends or issues the appropriate challenge to the user at the client. The user at the client receives the challenge in step 220 and sends an appropriate response to the host in step 222. The host receives the response from the client in step 224. The method is continued in step 302 of FIG. 3.

Turning to FIG. 3, reference numeral 300, in step 302, the host verifies the response received from the client for the challenge issued to the user. In an embodiment, the host verifies the response using an authentication system or server. In step 304, a determination is made as to whether or not the response is correct. If the response is correct, then the host grants the electronic service request in step 306 and the electronic service request is granted in step 310, whereby the user is allowed to conduct the electronic service request. However, if an incorrect response is received ("N" branch) in step 304, then the host denies the electronic service request in step 308 and the electronic service request denied message is communicated to the client in step 312, ending the process at step 316. Further, going back to step 310, if the user at a client wishes to perform another electronic service request in step 314, then the authentication process is repeated from step 202 in FIG. 2. However, if the user does not wish to perform another electronic service request, then the process ends at step 316.

Figure 4:
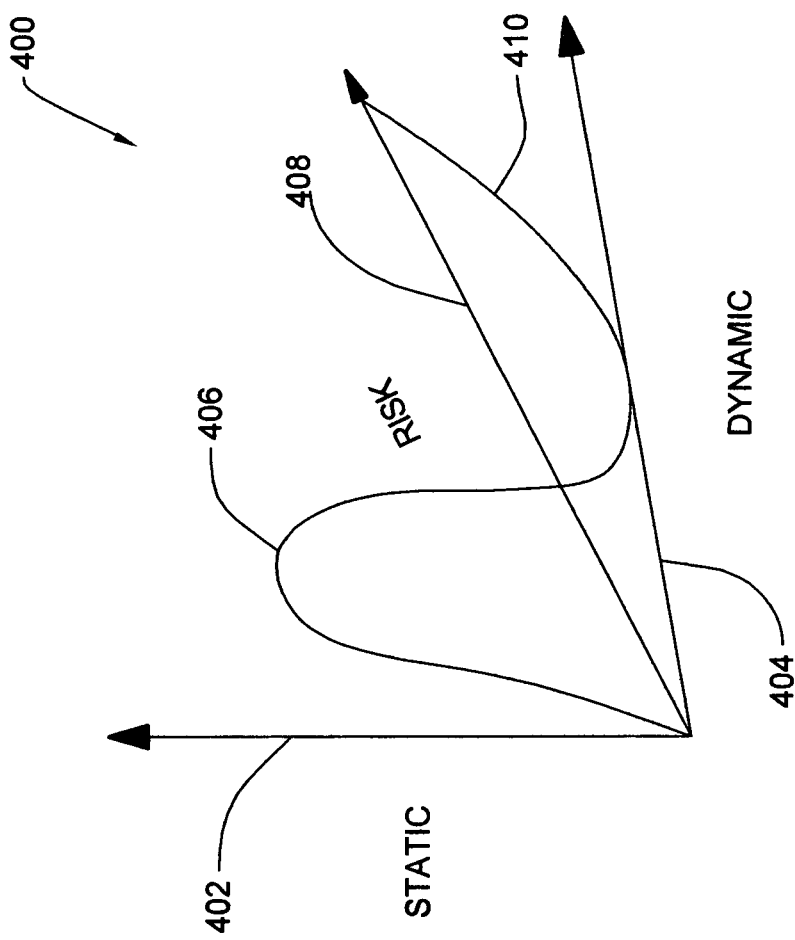
FIG. 4 is a graphical illustration of the relationship between the risk level assessed and the type or nature of challenge that is issued to a user seeking to perform an electronic service request, in accordance with an embodiment of the present invention.
Figure 5:
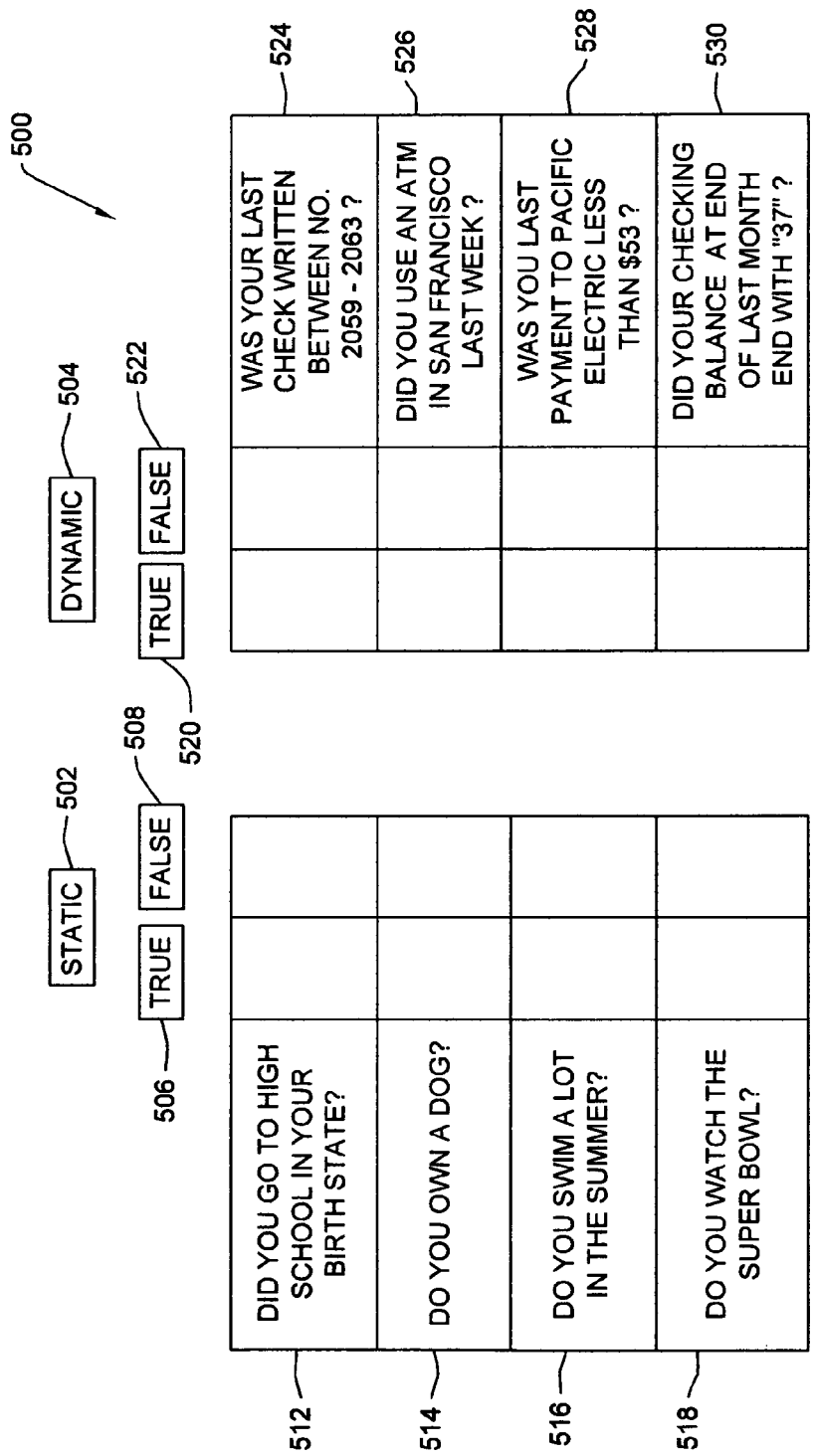
FIG. 5 is a tabular representation of static and dynamic challenges issued to a user seeking to perform an electronic service request, in accordance with an embodiment of the present invention.

Reference is now made to FIGS. 4 and 5, with FIG. 4 illustrating the relationship between risk and the type of challenge issued to a user and with FIG. 5 illustrating examples of static challenges and dynamic challenges that may be issued to a user. Turning to FIG. 4, reference numeral 400 graphically illustrates a relationship between risk and the type of challenge that is issued to a user requesting an electronic service. In FIG. 4, risk or risk level is represented by axis 408, static challenges are represented by axis 402 and dynamic challenges are represented by axis 404. As shown by the risk axis 408, as the risk level for an electronic service request increases (towards the arrow end), so does the type of challenge that is issued to the user. In particular, as shown in an embodiment in FIG. 4, a static challenge corresponds to a relatively low risk level (curve portion 406) that may be identified for an electronic service requested, whereas a dynamic challenge corresponds to a relatively high risk level (curve portion 410) that may be identified for the electronic service requested. Moreover, in an embodiment, a static challenge is a challenge that is predetermined by the user, that is, the user pre-selects or pre-determines, for instance, during initial registration with the host system, certain challenges or questions that should be issued to the user for security purposes and the user provides pre-determined responses or answers to these static challenges. The static challenges pre-selected by the user may be stored in a storage system, for instance, in a database, which can be accessed by the host system. Further, in an embodiment, a dynamic challenge is a challenge generated by a customer data/analytics system, such as a CRM (Customer Relationship Management) system, which monitors or tracks a user's behavior and/or transaction history over a course of time and stores user profile data and/or user activity data in a storage system, such that the CRM system can generate an appropriate dynamic challenge to be issued to a user, where only the genuine or authentic user would know the response to the dynamic challenge. In an embodiment, the host system utilizes a CRM system and obtains a dynamic challenge from the CRM system, as necessary in order to allow a user to proceed with the performance of an electronic service request.

Turning to FIG. 5, reference numeral 500 shows a table, under the label static 502, with examples of static challenges. For instance, one static challenge 512 may be "Did you go to high school in your birth state?". Another static challenge 514 may be "Do you own a dog?". Yet another example of a static challenge 516 may be "Do you swim a lot in the summer?" or perhaps a static challenge 518 may be "Did you watch the Super Bowl?". Similarly, the responses or answers provided by the user would be stored in a storage system. In an embodiment, the host system would track (by using a fraud/variance monitoring system and/or a CRM system) whether a correct response (true 506) was received to any of the static challenges 512 through 518 issued to the user and grant access or deny access if an incorrect (false 508) response is received, as illustrated in steps 306 and 308 described herein above. Further, in an embodiment, since the host system is likely to receive communication from the fraud/variance monitoring system as to any incorrect response(s) received from the user, the host system may be prompted in light of the incorrect response(s) to obtain a dynamic challenge generated by the CRM system, which monitors or tracks and stores user profiles. Similarly, the table under the label dynamic 504 shows examples of dynamic challenges, which are not recorded anywhere except in the CRM system. For example, one dynamic challenge 524 may be "Was your last check written between no. 2059 and 2063?", another dynamic challenge 526 may be "Did you use an ATM in San Francisco last week?". Yet another example of a dynamic challenge 528 may be "Was your last payment to Pacific Electric less than $53?" or perhaps another dynamic challenge 530 may be "Did your checking balance at end of last month end with "37"?". The host system would track (by using a fraud/variance monitoring system and/or a CRM system) whether a correct response (True 520) was received to any of the dynamic challenges 524 through 530 issued to the user and grant access or deny access if an incorrect response (False 522) is received, as illustrated in steps 306 and 308 described herein above.

Figure 6:
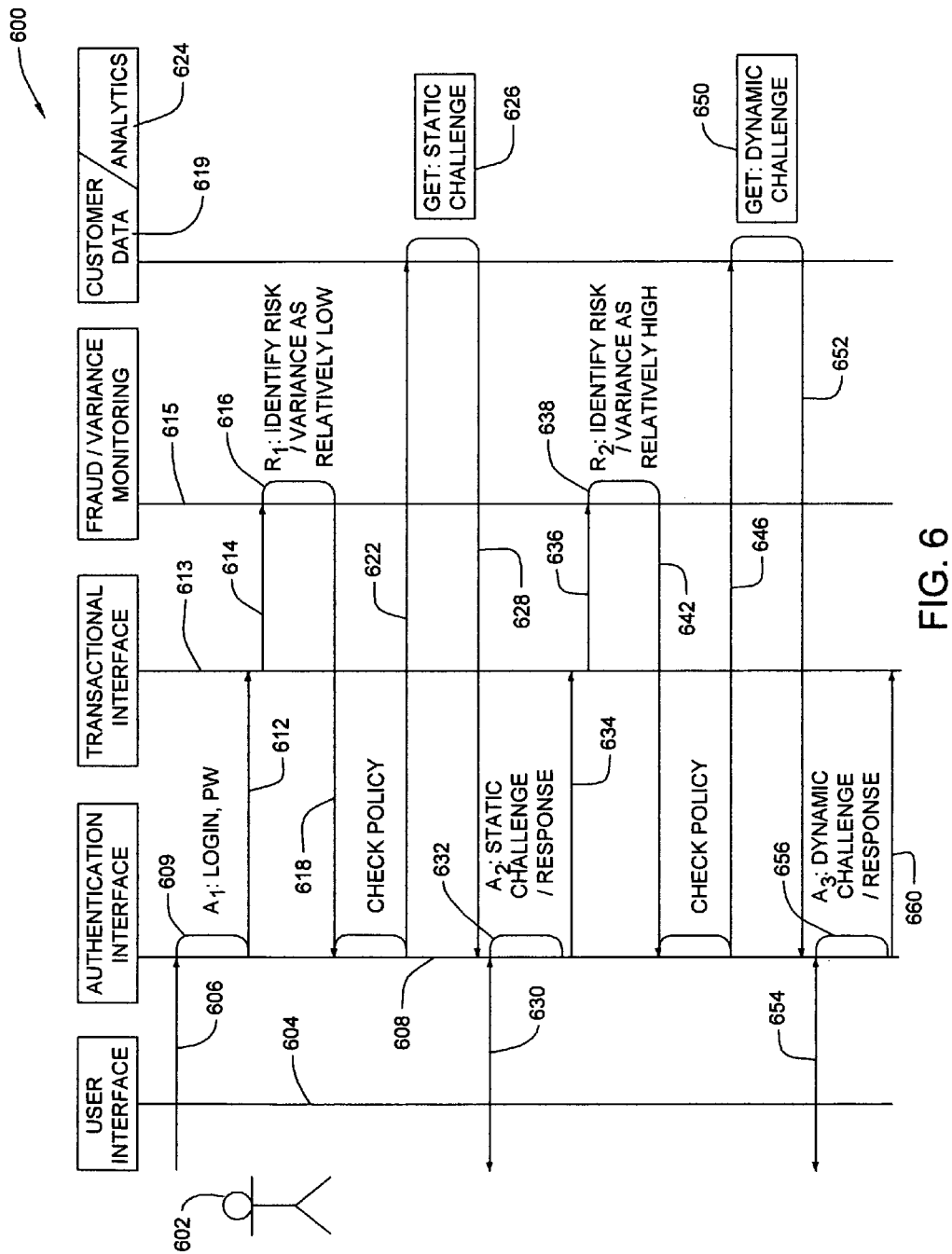
FIG. 6 illustrates an example of authenticating a user seeking to perform an electronic service request, in accordance with an embodiment of the present invention.

Reference is now made to FIGS. 6 through 9, which illustrate an example of an authentication process for authenticating a user seeking to access a host system or host server (for example, a transaction server) in order to perform an electronic service request. Turning to FIG. 6, reference numeral 600 illustrates an authentication process whereby a user is issued first a static challenge and then a dynamic challenge. In particular, a user 602 via a user interface component 604 enters a login ID or username and password (represented by the arrow 606) for accessing a host system or server. For instance, in an electronic banking transaction or electronic service request, a user may log into an ATM using a user console that is provided or log into an online banking website or any other website using a user interface provided by a computer, a cell phone, etc. The login ID or username and password is authenticated via an authentication interface component 608 of an authentication system employed by the host system, which verifies (indicated by reference numeral 609) the login ID or username and password. If the login ID or username and password provided by the user are correct the user is granted access to the transactional interface component 613 of the host system, where the user can request an electronic service (represented by the arrow 612). For instance, if the user is trying to access an online banking website, after inputting the username and password, the user is extended an interface to the host banking system. As soon as the user accesses the host system (banking system), a fraud/variance monitoring system 615 tracks or monitors the user's activities (represented by the arrow 614) and analyzes (indicated by reference numeral 616) current parameters associated with the user and/or the electronic service request or transaction and compares it with normal or standard operating parameters that have been established for the particular user and/or the type of electronic service or transaction being requested. As in the example shown in FIG. 6, the fraud/variance monitoring system 615 may determine through analysis (reference numeral 616) that the parameters are not that atypical, for instance, the user is logging in from a different location, but is still within the country. As such, the fraud/variance monitoring system may determine (reference numeral 616) that the risk/variance associated with the electronic service request is relatively low and communicates (represented by the arrow 618) the risk/variance analysis results to the authentication system. If necessary, the authentication system or server may check any existing business policies or rules as to what action should be taken in the current situation. Based on the low risk level and/or variances associated with the electronic service requested, the authentication system obtains (represented by the arrow 622) a static challenge 626, which, in an embodiment, is stored in a customer data system 619, such as a customer database. Further, the static challenge is issued to the user (represented by the arrow 628), which the user receives and sends back a response to the static challenge (represented by the double-sided arrow 630). The authentication system verifies the static challenge and response (indicated by reference numeral 632) and allows the user (represented by the arrow 634) to perform or execute the electronic service requested, only if the response received is correct. As the session progresses or continues, a fraud/variance monitoring system 615 takes a look at what the user is doing (represented by the arrow 636) and, again, monitors and analyzes (indicated by reference numeral 638) with reference to current parameters associated with the current electronic service request or transaction and compares it with normal or standard parameters that have been established for the user and/or the type of electronic transaction requested by the user. As in the example shown in FIG. 6, the fraud/variance monitoring system 615 may determine through analysis (reference numeral 616) that the parameters are not typical or normal, for instance, the user is requesting transfer of a large sum of money, more than the maximum allowed at one time. Accordingly, the monitoring system identifies the risk/variance as being relatively high and communicates (represented by the arrow 642) the risk/variance assessment to the authentication system. If necessary, the authentication system or server may check any existing business policies or rules as to what action should be taken in the current situation. Based on the risk level and/or variances associated with the electronic service requested, the authentication system obtains (represented by the arrow 646) a dynamic challenge 650, which, in an embodiment, is generated by an analytics system 624, such as a CRM system. The information requested by a dynamic challenge is gathered or tracked by a CRM system and is related to the user's behavior and is preferably not information that is recorded anywhere other than in the CRM system. As such, the dynamic challenge is issued to the user (represented by the arrow 652), which the user receives and sends back (represented by the double-sided arrow 654) a response to the dynamic challenge. The authentication system verifies (indicated by reference numeral 656) the dynamic challenge and response and allows (represented by the arrow 660) the user to perform or execute the electronic service requested, only if the response received is correct. It should be noted that if the response received to an issued challenge is incorrect, the electronic service request is denied and the user may be disconnected from the host banking system and may be referred to a customer service contact number for further assistance.

Figure 7:
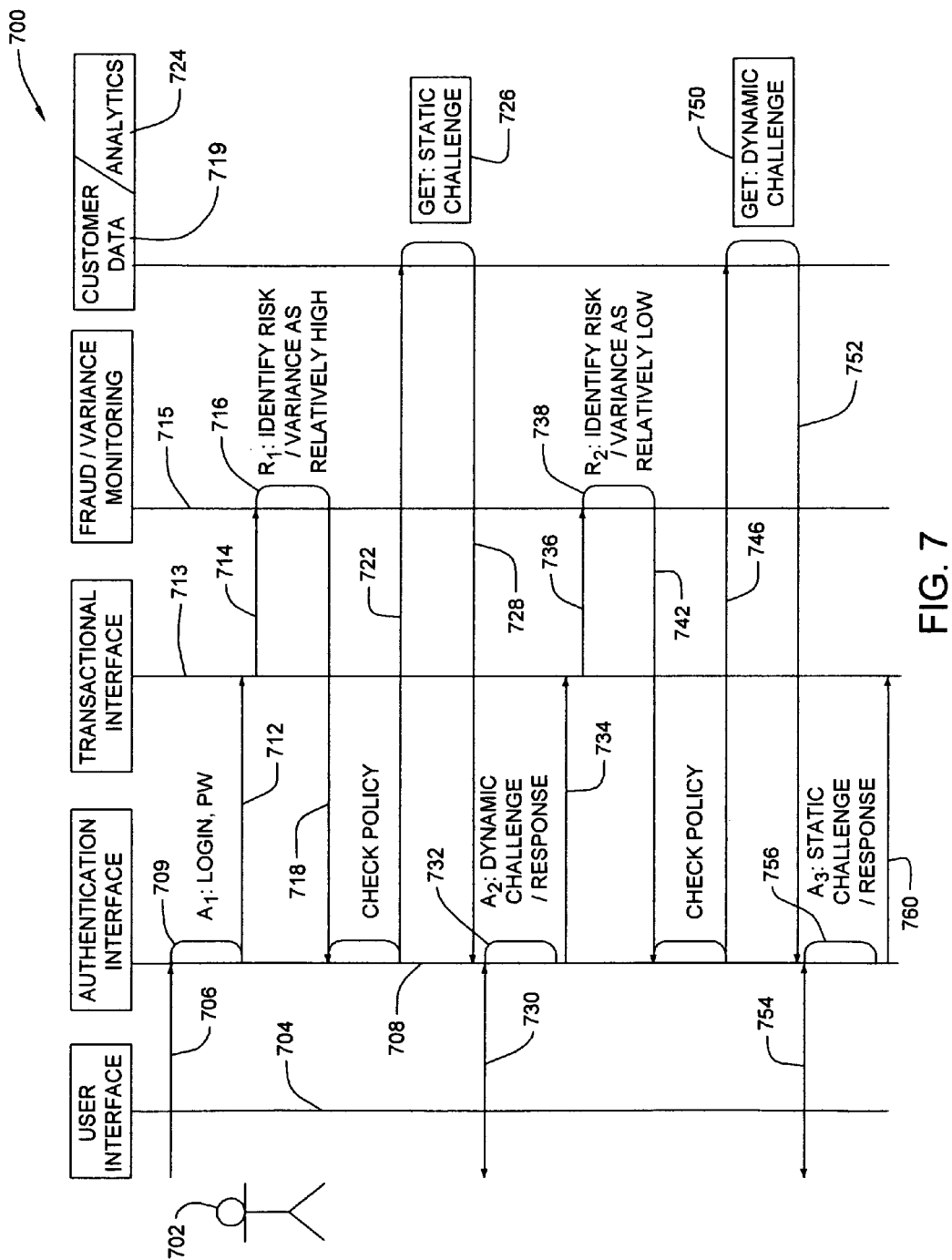
FIG. 7 illustrates an example of authenticating a user seeking to perform an electronic service request, in accordance with an embodiment of the present invention.

Turning to FIG. 7, reference numeral 700 illustrates an example of an authentication process for authenticating a user, where a user is issued both a static challenge and a dynamic challenge (similar to the example in FIG. 6), except in this example, a dynamic challenge is issued first, followed by a static challenge. In particular, a user 702 logs in or inputs via a user interface component 704 a login ID or username and password (represented by the arrow 706) in order to access a host system or server. The login ID or username and password is authenticated via an authentication interface component 708 of an authentication system employed by the host system, which verifies (indicated by reference numeral 709) the login ID or username and password provided by the user. If the login ID or username and password provided by the user are correct the user is granted access to the transactional interface component 713 of the host system, where the user can request an electronic service (represented by the arrow 712). Again, as soon as the user accesses the host system, a fraud/variance monitoring system 715 takes a look at what the user is doing (represented by the arrow 714) and analyzes (indicated by reference numeral 716) current parameters associated with the electronic service request or transaction and compares it with normal or standard parameters that have been established for the type of electronic transaction. As in the example shown in FIG. 7, the fraud/variance monitoring system 715 may determine through analysis (reference numeral 716) that the parameters are not typical or normal, for instance, the user is requesting transfer of a large sum of money, more than the maximum allowed at one time and/or the user has logged into the system from a different country, etc. Accordingly, the monitoring system identifies the risk/variance as being relatively high and communicates (represented by the arrow 718) the risk/variance assessment to the authentication system. If necessary, the authentication system or server may check any existing business policies or rules as to what action should be taken in the current situation. Based on the risk level and/or variances associated with the electronic service requested, the authentication system obtains (represented by the arrow 722) a dynamic challenge 726, which, in an embodiment, is generated by an analytics system 724, such as a CRM system. Again, the information requested in a dynamic challenge is gathered or tracked by a CRM system and is related to the user's behavior and is preferably not information that is recorded anywhere other than in the CRM system. The dynamic challenge is issued to the user (represented by the arrow 728), which the user receives and sends back a response to the static challenge (represented by the double-sided arrow 730). The authentication system verifies (indicated by reference numeral 732) the dynamic challenge and response and allows (represented by the arrow 734) the user to perform or execute the electronic service requested, only if the response received is correct. Again, a fraud/variance monitoring system 715 continues to monitor the user's activities (represented by the arrow 736) and analyzes (indicated by reference numeral 738) current parameters associated with the user and/or the current electronic service request or transaction and compares it with normal or standard parameters that have been established for the user and/or the type of electronic transaction. As in the example shown in FIG. 7, the fraud/variance monitoring system 715 may determine through analysis (reference numeral 738) that the parameters are not that atypical, for instance, the user is requesting a transfer of a small amount of money. As such, the fraud/variance monitoring system may determine (reference numeral 738) that the risk/variance associated with the electronic service request is relatively low and communicates (represented by the arrow 742) the risk/variance analysis results to the authentication system. If necessary, the authentication system or server may check any existing business policies or rules as to what action should be taken in the current situation. Based on the low risk level and/or variances associated with the electronic service requested, the authentication system obtains (represented by the arrow 746) a static challenge 750, which, in an embodiment, is stored in a customer data system 719, such as a customer database. Further, the static challenge is issued to the user (represented by the arrow 752), which the user receives and sends back a response to the static challenge (represented by the double-sided arrow 730). The authentication system verifies the static challenge and response (indicated by reference numeral 754) and allows the user (represented by the arrow 760) to perform or execute the electronic service requested, only if the response received is correct. Again, if an incorrect response is received to a challenge at any point, the electronic service request is denied and the user may be disconnected from the host banking system and may be referred to a customer service contact number for further assistance.

Figure 8:
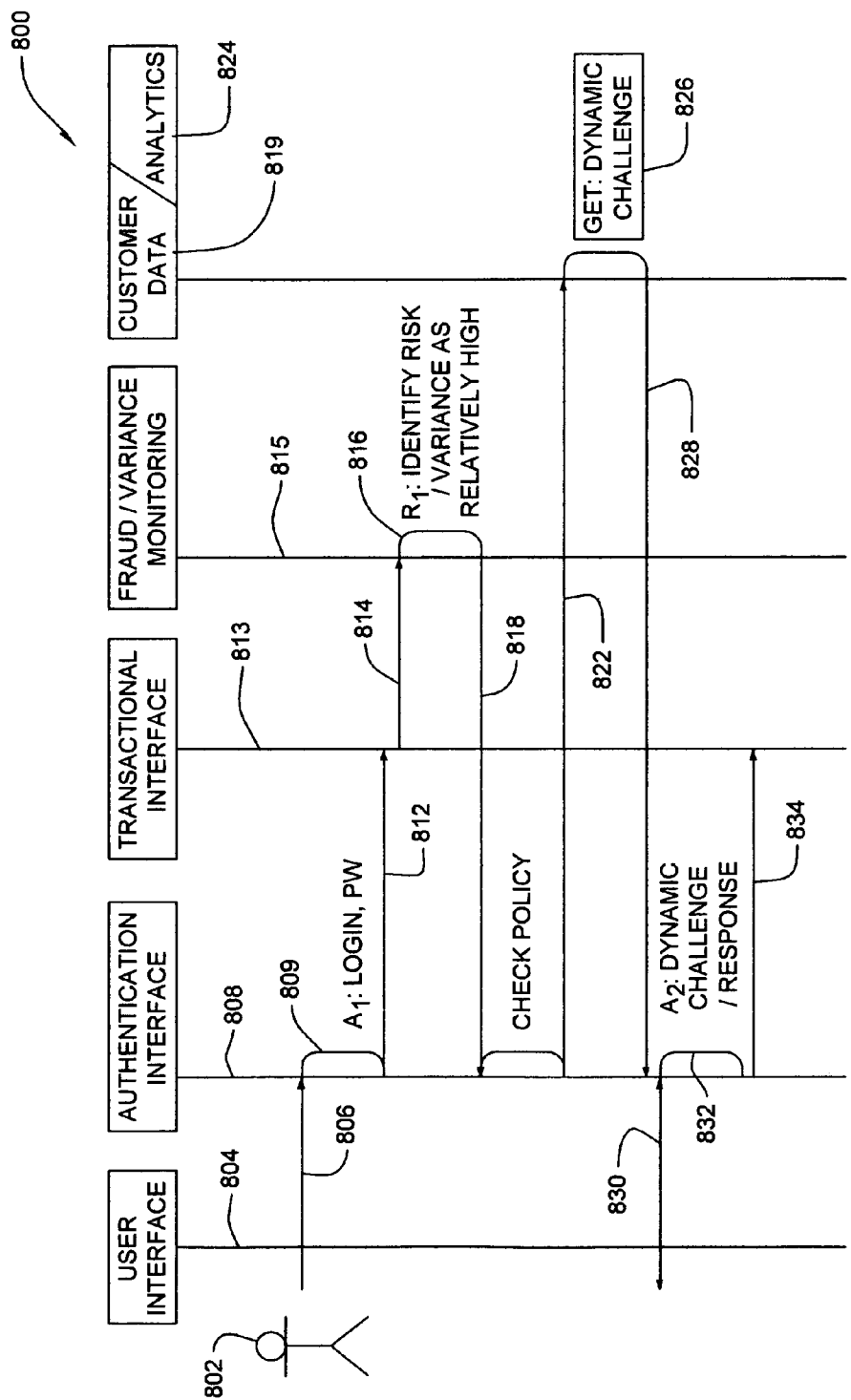
FIG. 8 illustrates an example of authenticating a user seeking to perform at least one electronic service request, in accordance with an embodiment of the present invention.

Turning to FIG. 8, reference numeral 800 illustrates another example of an authentication process whereby a user is only issued a dynamic challenge. In particular, a user 802 logs in via a user interface component 804 a login ID or username and password (represented by the arrow 806) in order to access a host system or server. The login ID or username and password is authenticated via an authentication interface component 808 of an authentication system employed by the host system, which verifies (indicated by reference numeral 809) the login ID or username and password. If the login ID or username and password provided by the user are correct the user is granted access to the transactional interface component 813 of the host system, where the user can request an electronic service (represented by the arrow 812). As soon as the user accesses the host system, a fraud/variance monitoring system 815 takes a look at what the user is doing (represented by the arrow 814) and analyzes (indicated by reference numeral 816) current parameters associated with the user and/or the electronic service request or transaction and compares it with normal or standard parameters that have been established for the user and/or the type of electronic transaction. As shown in FIG. 8, the fraud/variance monitoring system 815 may determine (reference numeral 816) that the risk/variance associated with the electronic service request is relatively high, for example, if the user is logged in from a different country and is trying to transfer money from an equity line of credit into a checking account, then the fraud/variance monitoring system communicates (represented by the arrow 818) the risk/variance assessment to the authentication system. Again, the authentication system or server may check any existing business policies or rules as to what action should be taken in the current situation. Based on the risk level and/or variances associated with the electronic service requested, the authentication system obtains (represented by the arrow 822) a dynamic challenge 826 given that the risk level and/or variances associated with the electronic service requested is relatively high. As already discussed hereinabove, in an embodiment, the dynamic challenge 826 is generated by an analytics system 824, such as a CRM system. Further, the dynamic challenge is issued to the user (represented by the arrow 828), which the user receives and sends back a response to the static challenge (represented by the double-sided arrow 830). The authentication system verifies (indicated by reference numeral 832) the static challenge and response and allows (represented by the arrow 834) the user to perform or execute the electronic service requested, only if the response received is correct.

Figure 9:
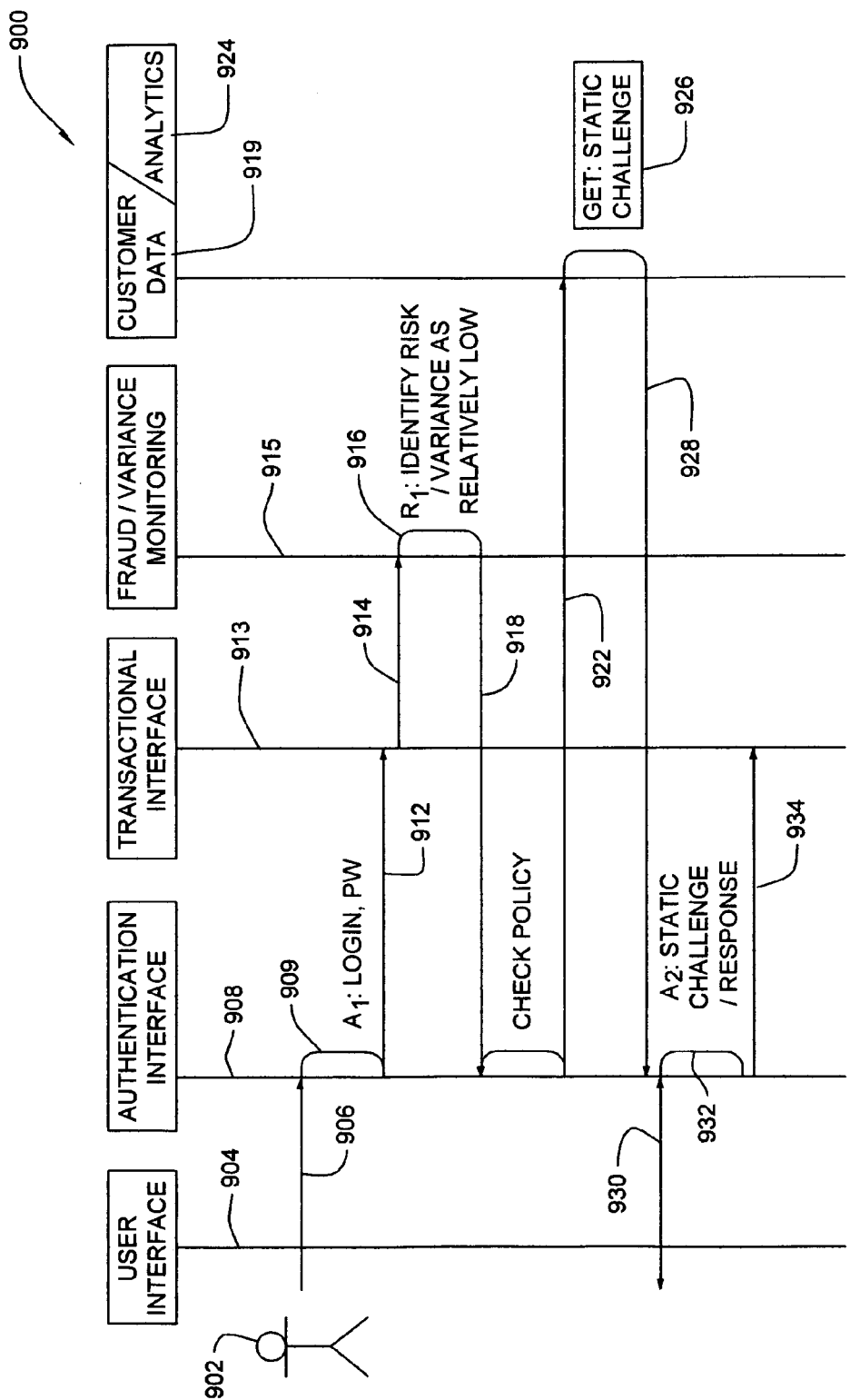
FIG. 9 illustrates an example of authenticating a user seeking to perform an electronic service request, in accordance with an embodiment of the present invention.

Turning to FIG. 9, reference numeral 900 illustrates another example of an authentication process whereby a user is only issued a static challenge. In particular, a user 902 logs in via a user interface component 904 a login ID or username and password (represented by the arrow 906) in order to access a host system or server. Again, the login ID or username and password is authenticated via an authentication interface component 908 of an authentication system employed by the host system, which verifies (indicated by reference numeral 909) the login ID or username and password. If the login ID or username and password provided by the user are correct the user is granted access to the transactional interface component 913 of the host system, where the user can request an electronic service (represented by the arrow 912). Again, a fraud/variance monitoring system 915 monitors what the user is doing (represented by the arrow 914) and analyzes (indicated by reference numeral 916) current parameters associated with the user and/or the electronic service request or transaction and compares it with normal or standard parameters that have been established for the user and/or the type of electronic transaction. As in the example shown in FIG. 9, the fraud/variance monitoring system 915 may determine through analysis (reference numeral 916) that the parameters are not that atypical, for instance, the user is logging in from a same location and/or is requesting a transfer of a small amount of money. As such, the fraud/variance monitoring system may determine (reference numeral 916) that the risk/variance associated with the electronic service request is relatively low and communicates (represented by the arrow 918) the risk/variance analysis results to the authentication system. If necessary, the authentication system or server may check any existing business policies or rules as to what action should be taken in the current situation. Based on the low risk level and/or variances associated with the electronic service requested, the authentication system obtains (represented by the arrow 922) a static challenge 926, which, in an embodiment, is stored in a customer data system 919, such as a customer database. Further, the static challenge is issued to the user (represented by the arrow 928), which the user receives and sends back a response to the static challenge (represented by the double-sided arrow 930). The authentication system verifies the static challenge and response (indicated by reference numeral 932) and allows the user (represented by the arrow 934) to perform or execute the electronic service requested, only if the response received is correct.

In another aspect of the invention, there is provided a system for authorizing a user to execute one or more electronic service requests. The system comprises an authentication module configured to authenticate user identity data received from a user seeking access to a host for executing one or more electronic service requests, the authentication module being configured to grant access to the host upon authentication of the user identity data, a fraud detection module configured to monitor each electronic service request of the one or more electronic service requests received from the user having access granted to the host, and the fraud detection module being configured to identify a risk level for the each electronic service request received from the user and to generate a challenge for the each electronic service request received from the user, the challenge corresponding to the risk level identified and corresponding to any associated business policies that may apply, such that the challenge generated is issued to the user by the authentication module, which authorizes the user to perform the each electronic service request if a correct response is received to the challenge issued. In an embodiment, the fraud detection module is further configured to track a set of user data profile associated with the user and to generate the challenge for the each electronic service request received from the user based on the user data profile associated with the user, and wherein the fraud detection module is further configured to detect whether or not any variances exist, using the set of user profile data associated with the user and to identify the risk level for the each electronic service request received from the user taking into account whether or not any variances exist. In an embodiment, the authentication module further comprises a policy module configured to apply one or more business policies for handling the risk level associated with any variances detected. In an embodiment, the challenge issued is chosen from a challenge group comprises at least one of: a user-preset challenge group and a customer relationship management challenge group, wherein the user-preset challenge group comprises of one or more challenges that are preset by the user, and wherein the customer relationship management challenge group comprises of one or more challenges that are generated using a customer relationship management system. In an embodiment, as the risk level identified for the each electronic service requested increases, a level of strength of any resulting authorization associated with the challenge issued to the user for the each electronic service request received increases. In an embodiment, the challenge chosen from the user-preset challenge group corresponds to a relatively low risk level identified for the electronic service, and wherein the challenge chosen from the customer relationship management challenge group corresponds to a relatively high risk level identified for the electronic service.

Figure 10:
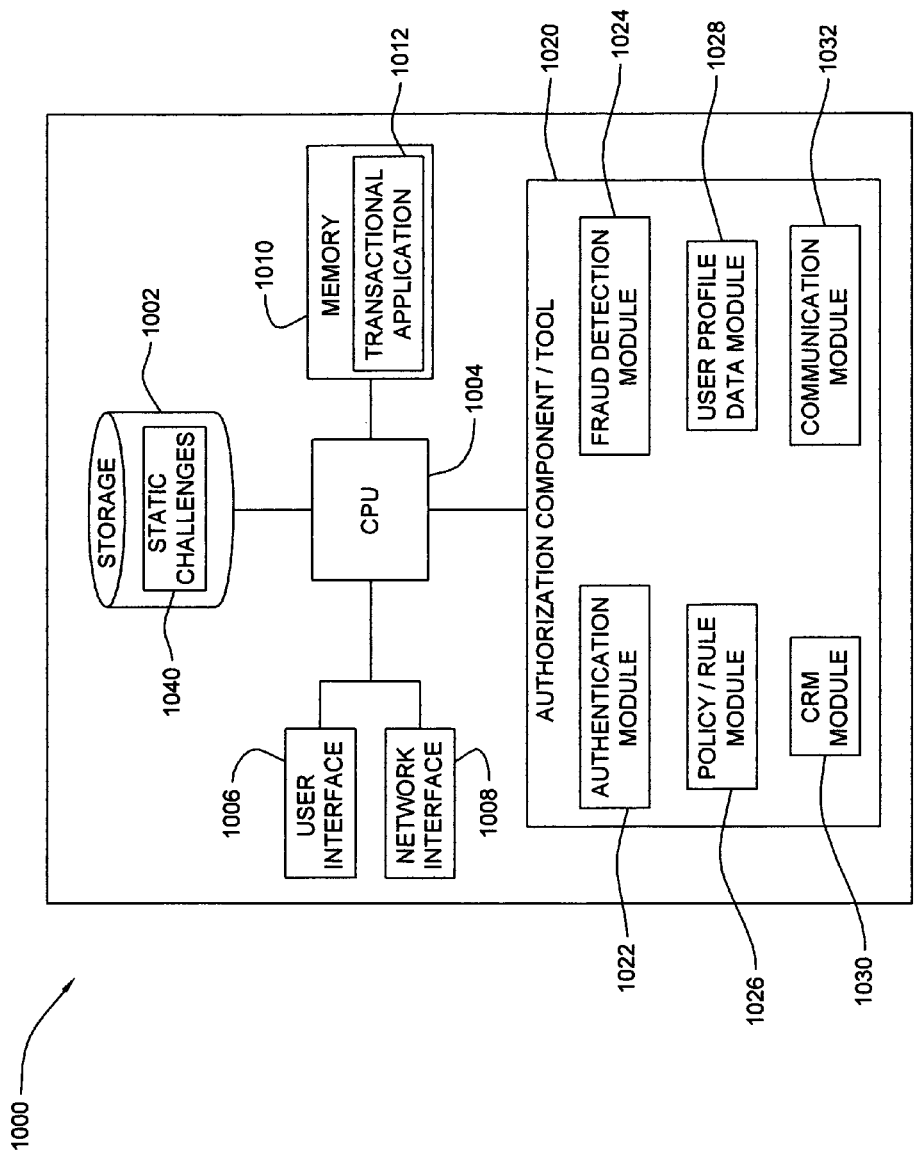
FIG. 10 is a schematic block system diagram illustrating an embodiment of a host system for authenticating a user seeking to perform an electronic service request, in accordance with an embodiment of the present invention.
Figure 11:
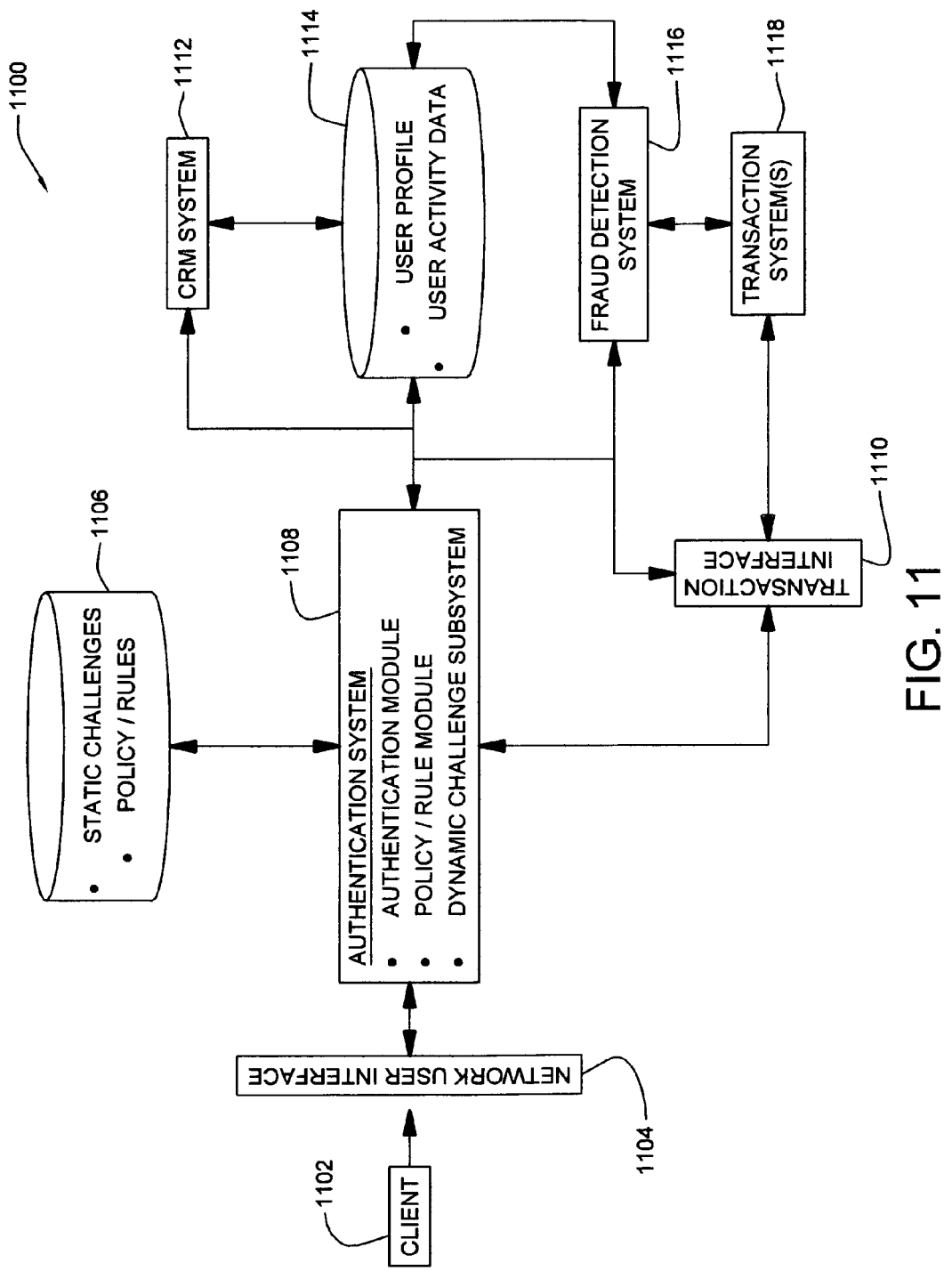
FIG. 11 is a schematic block system diagram illustrating an embodiment of a system for authenticating a user seeking access to a host or transaction system for executing one or more electronic service requests, in accordance with an embodiment of the present invention.

Reference is now made to FIGS. 10 and 11, which illustrate embodiments of a system for authenticating a user seeking to perform an electronic service request or transaction. Turning to FIG. 10, FIG. 10 is a schematic block system diagram illustrating one embodiment of a host system or server 1000 (for example, a transaction system) having an authorization component or tool 1020 deployed thereon, the authorization component or tool 1020 being configured to authenticate a user seeking to perform an electronic service request, in accordance with an embodiment of the present invention. Preferably, the host system 1000 is a server, for instance, a transaction server that includes a central processing unit (CPU) 1004, a local storage device 1002, a user interface 1006, a network interface 1008, and a memory 1010. The CPU 1004 is configured generally to execute operations within the host system/server 1000. The user interface 1006, in one embodiment, is configured to allow a user to interact with the host system 1000, including allowing input data and commands from a user and communicating output data to the user. The network interface 1008 is configured, in one embodiment, to facilitate network communications of the host system 1000 over a communications channel of a network (not shown in any of the drawings). The local memory 1010 is configured, in one embodiment, to store a transactional or electronic service application 1012, for instance, an online banking application, which the user accesses to perform or execute an electronic service request. Further, in one embodiment, the static challenges 1040, which are the user preset or predetermined challenges, are stored in storage 1002, and can be accessed by the authorization component/tool 1020 (discussed herein below) in order to issue a challenge to a user.

In one embodiment, as shown in FIG. 10, the authorization component or tool 1020 which runs on the host system 1000 comprises a logic unit that contains a plurality of modules configured to functionally execute the necessary steps of authenticating a user seeking to perform or execute an electronic service request. In particular, the authorization component or tool 1020 includes an authentication module 1022, a fraud detection module 1024, a policy/rule module 1026, a user profile data module 1028, a CRM module 1030, and a communication module 1032. The authentication module 1022 of the authorization component or tool 1020 is configured to communicate with an authentication system that authenticates a user seeking to access the host system 1000 in order to perform an electronic service request. The fraud detection module 1024 is configured to communicate with a fraud/variance monitoring system that tracks any electronic service request or requests carried out by the user upon access to the host system 1000. Further, the fraud detection module 1024 is configured to obtain from the fraud/variance monitoring system a risk and/or variance assessment pertaining to and/or associated with the electronic service request or requests. Further, the policy/rule module 1026 is configured to communicate with a policy or rule system that contains business policies or business rules that are applicable in certain situations or conditions, such that the host system can determine what appropriate action should be taken in a given situation. The user profile data module 1028 is configured to communicate with a customer data system, such as a customer database, in order to obtain any relevant customer data that may be stored in the customer database. Moreover, the CRM module 1030 is configured to communicate with a CRM (customer relationship management) system, which tracks a customer's or user's behavior, such that relevant profile information regarding the user or customer can be used in conjunction with the user activity monitored by the fraud/variance monitoring system in order to issue a dynamic challenge to a user seeking to perform an electronic service requested by a user. Further, the communication module 1032 is configured to permit communication between the various modules of the authorization component or tool 1020 and the various systems, such as an authentication system, a fraud/variance monitoring system, a customer data system and/or a CRM system.

Turning to FIG. 11, reference numeral 1100 provides a schematic block diagram of an embodiment of a system 1100 for authenticating a user seeking to perform an electronic transaction or an electronic service request. The client machine 1102 (which the user uses) accesses the host system 1100 via a network user interface 1104, which is configured, in one embodiment, to facilitate network communications of the host system 1000 over a communications channel of a network. In an embodiment, the authentication system 1108 comprises an authentication module, a policy/rule module and a dynamic challenge subsystem. As shown in FIG. 11, the authentication system 1108 is in communication with a storage system 1106, a CRM system 1112, a storage system 1114, a fraud detection system 1116, and one or more transaction system(s) 1118. Further, the authentication system 1108 allows a client 1102 access to the one or more transaction system(s) 1118 via a transaction interface 1110, which is configured, in one embodiment, to perform an electronic service request or transaction after the user at client 1102 has been authenticated and authorized. Furthermore, the transaction interface 1110 is in communication with the fraud detection system 1116, such that any transaction requested by a user granted access to the system 1100 can be monitored. Moreover, user activity data tracked by the fraud detection system may be stored in a storage system 1114, such as a database, which can be accessed by the authentication system 1108. Similarly, a CRM system 1112 may store user profile data monitored and tracked in storage system 1114, so that the dynamic challenge subsystem or module of the authentication system 1108 can obtain dynamic challenges generated by the CRM system 1112 based on user profile data stored in storage system 1114. Furthermore, the authentication system 1108 can access static challenges stored in storage 1106, such as a database, where the static challenges are challenges that have been preset or predetermined by a user during a registration process. Additionally, in an embodiment, the authentication system 1108 can access policies or rules that are stored in storage system 1106 in order to determine what action should be taken in a given situation.

In yet another aspect of the invention, there is provided a computer program product for authenticating a user. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to authenticate user identity data received from a user requesting an electronic service, the first program instructions including instructions to authorize the user upon authentication of the user identity data, second program instructions to track a set of user data profile associated with the user and to identify a risk level for the electronic service requested, the risk level being based on the set of user profile data associated with the user, third program instructions to issue a challenge to the user, the challenge corresponding to the risk level identified for the electronic service requested, the challenge being selected from either a static challenge group or a dynamic challenge group according to a business policy associated with the risk level identified, such that the user is authorized to conduct the electronic service if a correct response is received to the challenge issued for the electronic service. Preferably, the first, second and third program instructions are stored on the computer readable medium. In an embodiment, the first program instructions include instructions to receive the user identity data comprising a username and a password and to authenticate the user identity data. In an embodiment, the second program instructions include instructions to detect, using the set of user profile data associated with the user, whether or not any variances exist, and to identify the risk level for the electronic service requested by the user taking into account whether or not any variances exist and any characteristics thereof. Further, in an embodiment, if any variances exist, the second program instructions include instructions to apply one or more business policies for handling any variances that are found, such that the challenge issued to the user corresponds to the risk level identified for the electronic service requested. In an embodiment, the static challenge group comprises of one or more static challenges that are preset by the user, and wherein the dynamic challenge group comprises of one or more dynamic challenges that are generated using a customer relationship management system. In an embodiment, each of the one or more static challenges corresponds to a relatively low risk level identified for the electronic service, and wherein each of the one or more dynamic challenges corresponds to a relatively high risk level identified for at least one electronic service.

Figure 12:
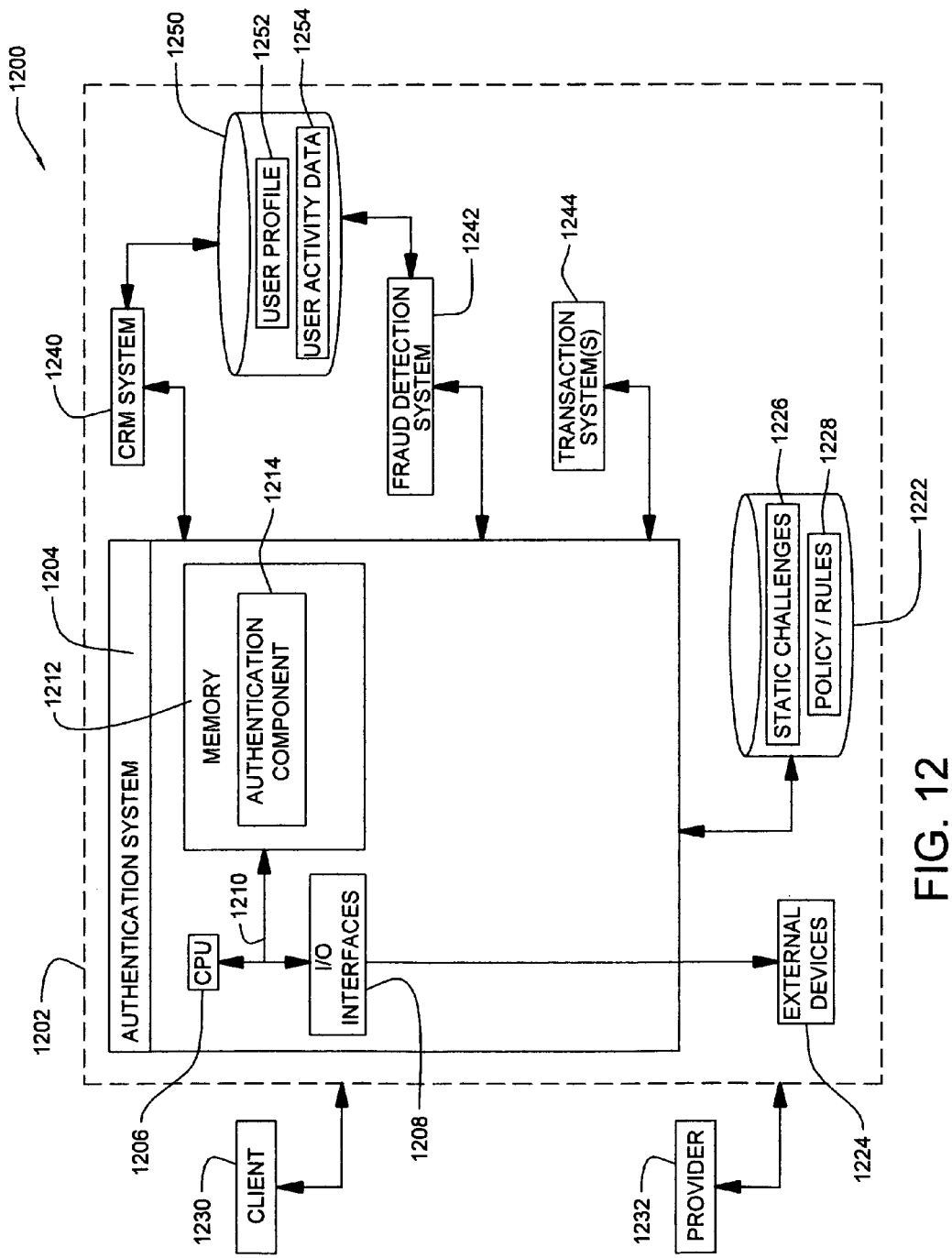
FIG. 12 is a schematic block system diagram illustrating an embodiment of a system for authenticating a user seeking access to a host or transaction system for executing one or more electronic service requests, in accordance with an embodiment of the invention.

Referring now to FIG. 12, there is illustrated a system 1200 for authenticating a user seeking access to a host or transaction system, in accordance with an embodiment of the present invention. As depicted, system 1200 includes a computer infrastructure 1202, which is intended to represent any type of computer architecture that is maintained in a secure environment (i.e., for which access control is enforced). As shown, infrastructure 1202 includes a computer system 1204 that typically represents an authentication server 1204 or the like for authenticating a user at a client (e.g., a personal computer, a laptop, a handheld device, etc), for instance, client 1230. Further, computer infrastructure 1202 includes a CRM system or server 1240, a fraud detection system or server 1242 and one or more transaction system(s) or server(s) 1244. It should be understood, however, that although not shown, other hardware and software components (e.g., additional computer systems, routers, firewalls, etc.) could be included in infrastructure 1202.

In general, a client (for instance, client 1230) is connected via a network to infrastructure 1202, which includes an authentication system or server 1204 configured to authenticate a user seeking access to a transaction system or server, for instance, transaction system 1242. To this extent, infrastructure 1202 provides a secure environment. In particular, a client accesses a transaction system over a network via interfaces (e.g., web browsers) loaded on the client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 1202 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 1202. It should be understood that under the present invention, infrastructure 1202 could be owned and/or operated by a party such as provider 1232, or by an independent entity. Regardless, use of infrastructure 1202 and the teachings described herein could be offered to the parties on a subscription or fee-basis. In either scenario, an administrator (not shown in FIG. 12) could support and configure infrastructure 1202.

Authentication system 1204 is shown to include a CPU (hereinafter "processing unit 1206"), a memory 1212, a bus 1210, and input/output (I/O) interfaces 1208. Further, computer system 1200 is shown in communication with external I/O devices/resources 1224 and storage system 1222. In general, processing unit 1206 executes computer program code, such as the authorization component or tool 1214, which is stored in memory 1212. While executing computer program code, the processing unit 1206 can read and/or write data, to/from memory 1212, storage system 1222, and/or I/O interfaces 1208. For instance, in one embodiment, the static challenges 1226, which are the user preset or predetermined challenges, are stored in storage 1222, and can be accessed by the authentication system 1204. Similarly, any business policies or rules 1228 are stored in storage 1222, and can be accessed by the authentication system 1204. Alternatively, business policies or rules 1228 could be stored in a separate storage within the infrastructure 1202. Further, in an embodiment, the CPU (not shown in FIG. 12) for each of the CRM system 1240 and fraud detection system 1242, respectively, can read and/or write data, to/from memory storage system 1250. For instance, the CRM system 1240, in an embodiment, stores user profile data 1252 in storage system 1250, whereas, the fraud detection system 1242 stores user activity data 1254 in storage system 1250 within computer infrastructure 1202. Bus 1210 provides a communication link between each of the components in computer system 1200, such that information can be communicated within the infrastructure 1202. External devices 1224 can comprise any devices (e.g., keyboard, pointing device, display, etc.) that enable a user to interact with computer system 1200 and/or any devices (e.g., network card, modem, etc.) that enable authentication system 1204 to communicate with one or more other systems or servers, such as the CRM system 1240, the fraud detection system 1242 and the one or more transaction system(s) 1244. For instance, the authentication system 1204 can obtain a dynamic challenge (to issue to the client 1230) that is generated by the CRM system 1240 based on the user profile data 1252 stored in storage system 1250. Similarly, the fraud detection system 1242 can communicate relevant information concerning an electronic transaction or electronic service request to the authentication system 1204.

Computer infrastructure 1202 is only illustrative of various types of computer infrastructures for implementing the invention. For example, in one embodiment, computer infrastructure 1202 comprises two or more computing devices (e.g., a server cluster) that communicate over a network to perform the various process steps of the invention. Moreover, computer system 1200 is only representative of various possible computer systems that can include numerous combinations of hardware. To this extent, in other embodiments, computer system 1200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1206 may comprise a single processing unit, or be distributed across one or more processing units in one or more locations, e.g., on a client and server. Similarly, memory 1212 and/or storage systems 1222 and 1250 can comprise any combination of various types of data storage and/or transmission media that reside at one or more physical locations. Further, I/O interfaces 1208 can comprise any system for exchanging information with one or more external devices 1224. Still further, it is understood that one or more additional components (e.g., system software, math co-processing unit, etc.) not shown in FIG. 12 can be included in computer system 1200. However, if computer system 1200 comprises a handheld device or the like, it is understood that one or more external devices 1224 (e.g., a display) and/or storage system(s) 1222 could be contained within computer system 1200, not externally as shown.

Storage systems 1222 and 1250 can be any type of system (e.g., a database) capable of providing storage for information under the present invention. To this extent, storage systems 1222 and 1250 could include one or more storage devices, such as a magnetic disk drive or an optical disk drive. In another embodiment, storage system 1222 and 1250 include data distributed across, for example, a local area network (LAN), wide area network (WAN) or a storage area network (SAN) (not shown). Although not shown, additional components, such as cache memory, communication systems, system software, etc., may be incorporated into computer system 1200.

In another embodiment, the invention provides a process for deploying computing infrastructure that includes integrating computer-readable code into a computing system, wherein the code in combination with the computing system is capable of performing a process for authenticating a user seeking access to a server for executing at least one electronic service. The process comprises authenticating user identity data received from a user seeking access to a host server to execute at least one electronic service, receiving a request from the user for at least one electronic service, issuing to the user at least a first challenge corresponding to at least one electronic service request received, at least first challenge being selected from either a user-preset challenge group or a customer relationship management challenge group, and authorizing at least one electronic service request if a correct response is received to at least first challenge issued. The issuing step further comprises checking a set of user profile data associated with the user, detecting whether or not any variances are found based on the set of user profile data associated with the user, and identifying a risk level for at least one electronic service request received based on whether or not any variances are found. In an embodiment, the detecting step further comprises applying, if any variances are found, one or more policies, using a business policies engine, for handling any variances that are found, such that at least the first challenge issued corresponds to the risk level identified for at least one electronic service request received in light of any variances found. In an embodiment, the user-preset challenge group comprises of one or more static challenges that are preset by the user, and wherein the customer relationship management challenge group comprises of one or more dynamic challenges that are generated using a customer relationship management system. In an embodiment, as the risk level identified for at least one electronic service request received increases, a level of complexity associated with the challenge issued to the user for at least one electronic service request received increases. In an embodiment, each of the static challenges corresponds to a relatively low risk level identified for at least one electronic service request received, and wherein each of the dynamic challenge corresponds to a relatively high risk level identified for at least one electronic service request received.

Accordingly, any of the components of the present invention as shown in FIG. 12 can be deployed, managed, serviced by a service provider 1232 who offers to authenticate a user seeking to access a host system and to perform or execute an electronic service request. Preferably, the invention provides a business method that performs the process steps of the invention on a subscription, advertising and/or fee basis. In particular, a service provider, such as a solution integrator could offer to authenticate a user seeking to access a host system and to perform or execute an electronic service request. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A processor-implemented method for authenticating a user seeking to perform at least one electronic service request, said method comprising the steps of:
    verifying, by a processor, user identity data received from a user requesting at least one electronic service from a plurality of electronic services;
    identifying, by the processor, a risk level for said at least one electronic service requested by said user, wherein identification of said risk level is based on a set of user profile data associated with said user;
    storing, by the processor, a static challenge that comprises at least one of a plurality of subjective questions for said user, wherein said at least one subjective question requests a subjective answer that is based on a subjective opinion, about said user, from said user;
    storing, by the processor, a dynamic challenge that comprises at least one of a plurality of objective questions for said user, wherein said at least one of said plurality of objective questions requests an objective answer that is based on a past financial transaction between said user and a financial institution;
    issuing to said user, using a customer relationship management system, a challenge corresponding to said risk level identified for said at least one electronic service requested, wherein said challenge is either said static challenge if said risk level is determined to be low or said dynamic challenge if said risk level is determined to be high, wherein only one of said static challenge or said dynamic challenge is issued based on said risk level of said user, and wherein said issuing further comprises:
        checking a set of user profile data associated with said user;
        detecting whether or not any variances are found based on said set of user profile data associated with said user; and
        identifying a risk level for said at least one electronic service request received based on whether or not said any variances are found; and
    authorizing said at least one electronic service requested only if a correct response is received to either said static challenge or said dynamic challenge.

2. The method according to claim 1, further comprising the steps of:
    monitoring any additional electronic service requested by said user;
    issuing to said user another challenge based on said any additional electronic service requested, said another challenge corresponding to a risk level identified for said any additional electronic service requested; and
    authorizing said user to conduct said any additional electronic service requested only if a correct response is received to said another challenge.

3. The method according to claim 1, wherein said verifying step comprises the steps of:
    receiving said user identity data comprising a username and a password; and
    authenticating said user identity data received using an authentication engine.

4. The method according to claim 1, wherein said detecting step further comprises the step of:
    if said any variances are found, applying, using a business rules engine, one or more rules for handling said any variances that are found, such that said at least first challenge issued corresponds to said risk level identified for said at least one electronic service requested.

5. The method according to claim 1, wherein said static challenge is created by said user during registration with a host system for said at least one electronic service, and wherein said dynamic challenge is created by a data/analytics system based on monitored behavior of said user over a course of time.

6. The method according to claim 1, wherein said subjective answer comprises an indeterminate frequency of a sporting activity by said user during a predetermined annual season.

7. The method according to claim 1, further comprising:
determining if a variance has occurred, wherein the variance is an unusual present user behavior, compared with typical past user behavior, that is exhibited by said user when requesting access to said at least one electronic service, and wherein said unusual present user behavior is said user logging into said at least one electronic service from a different location and a different time than a usual location and time for previous log ins by said user to said at least one electronic service; and issuing said static challenge or said dynamic challenge based on characteristics of any variances found, any business rules and policies that are applicable, and an assessment of risk level for said at least one electronic service requested.

8. A system for authorizing a user to execute one or more electronic service requests, comprising:

an authentication module configured to authenticate user identity data received from a user seeking access to a host for executing one or more electronic service requests, said authentication module being configured to grant access to said host upon authentication of said user identity data; and a fraud detection module configured to monitor each electronic service request of said one or more electronic service requests received from said user having access granted to said host, said fraud detection module being configured to identify a risk level for said each electronic service request received from said user and to generate a challenge for said each electronic service request received from said user, said challenge corresponding to said risk level identified and corresponding to any associated business policies that may apply, such that said challenge generated is issued to said user by said authentication module, which authorizes said user to perform said each electronic service request if a correct response is received to said challenge issued, wherein said issuing comprises checking a set of user profile data associated with said user; detecting whether or not any variances are found based on said set of user profile data associated with said user; and identifying a risk level for said each electronic service request received based on whether or not said any variances are found, wherein said challenge is a static challenge if said risk level is determined to be low, wherein said challenge is a dynamic challenge if said risk level is determined to be high, wherein said static challenge comprises at least one of a plurality of subjective questions for said user, wherein said at least one of said plurality of subjective questions requests a subjective answer that is based on a subjective opinion, about said user, from said user, and wherein only one of said static challenge and said dynamic challenge is issued based on said risk level of said user.

9. The system according to claim 8, wherein said challenge issued is chosen from a challenge group comprising at least one of: a user-preset challenge group and a customer relationship management challenge group; wherein said user-preset challenge group comprises one or more challenges that are preset by said user; and wherein said customer relationship management challenge group comprises one or more challenges that are generated using a customer relationship management system.

10. The system according to claim 9, wherein as said risk level identified for said each electronic service requested increases, a level of strength of any resulting authorization associated with said challenge issued to said user for said each electronic service request received increases.

11. The system according to claim 10, wherein said challenge chosen from said user-preset challenge group corresponds to a relatively low risk level identified for said each electronic service; and wherein said challenge chosen from said customer relationship management challenge group corresponds to a relatively high risk level identified for said each electronic service, wherein the relatively low risk level is lower than the relatively high risk level.

12. The system according to claim 8, wherein said authentication module further comprises:

a policy module configured to apply one or more business policies for handling said risk level associated with said any variances detected.

13. A computer program product for authenticating a user, said computer program product comprising:

a non-transitory computer readable medium;

first program instructions to verify user identity data received from a user requesting at least one of a plurality of electronic services;

second program instructions to identify a risk level for said at least one of said plurality of electronic services requested by said user, wherein identification of said risk level is based on a set of user profile data associated with said user;

third program instructions to establish a static challenge that comprises at least one of a plurality of subjective questions for said user, wherein said at least one subjective question requests a subjective answer that is based on a subjective opinion, about said user, from said user;

fourth program instructions to establish a dynamic challenge that comprises at least one of a plurality of objective questions for said user, wherein said at least one objective question requests an objective answer that is based on a past financial transaction between said user and a financial institution;

fifth program instructions to issue to said user, using a customer relationship management system, a challenge corresponding to said risk level identified for said at least one electronic service requested, wherein said challenge is either said static challenge if said risk level is determined to be low or said dynamic challenge if said risk level is determined to be high, wherein only one of said static challenge and said dynamic challenge is issued based on said risk level of said user, and wherein said fifth program instructions further comprise instructions to check a set of user profile data associated with said user; detect whether or not any variances are found based on said set of user profile data associated with said user; and identify a risk level for said at least one electronic service request received based on whether or not said any variances are found; and sixth program instructions to authorize said at least one electronic service requested only if a correct response is received to either said static challenge or said dynamic challenge; and wherein said first, second, third, fourth, fifth, and sixth program instructions are stored on said non-transitory computer readable medium.

14. The computer program product according to claim 13, wherein said first program instructions include instructions to receive said user identity data comprising a username and a password and to authenticate said user identity data.

15. The computer program product according to claim 13, wherein if said any variances exist, said second program instructions include instructions to apply one or more business policies for handling said any variances that are found, such that said challenge issued to said user corresponds to said risk level identified for said at least one electronic service requested.

16. The computer program product according to claim 15, wherein said static challenge group comprises one or more static challenges that are preset by said user;
and wherein said dynamic challenge group comprises one or more dynamic challenges that are generated using a customer relationship management system.

17. The computer program product according to claim 13, further comprising:
seventh program instructions to determine if a variance has occurred, wherein a variance is an unusual present user behavior, compared with typical past user behavior, that is exhibited by said user when requesting access to said at least one electronic service; and
eighth program instructions to issue said static challenge or said dynamic challenge based on characteristics of any variances found, any business rules and policies that are applicable, and an assessment of risk level for said at least one electronic service requested, and wherein said seventh and eighth program instructions are stored on said non-transitory computer readable medium.

18. A process for deploying computing infrastructure comprising integrating computer-readable code into a computing system, wherein said code in combination with said computing system is capable of performing a process for authenticating a user seeking access to a server for executing at least one electronic service, said process comprising:
authenticating, by a processor, user identity data received from a user seeking access to a host server to execute at least one electronic service;
receiving, by the processor, a request from said user for said at least one electronic service;
issuing, by the processor, to said user at least a first challenge corresponding to said at least one electronic service request received, said first challenge being selected from either a user-preset challenge group or a customer relationship management challenge group, wherein said first challenge is a static challenge if a risk level for accessing said at least one electronic service is determined to be low, and wherein said first challenge is a dynamic challenge if said risk level for accessing said at least one electronic service is determined to be high, wherein said static challenge comprises at least one of a plurality of subjective questions for said user, wherein said at least one subjective question requests a subjective answer that is based on a subjective opinion, about said user, from said user, and wherein only one of said static challenge or said dynamic challenge is issued based on said risk level of said user, and wherein said issuing further comprises:
checking a set of user profile data associated with said user;
detecting whether or not any variances are found based on said set of user profile data associated with said user; and
identifying a risk level for said at least one electronic service request received based on whether or not said any variances are found; and
authorizing, by the processor, said at least one electronic service request if a correct response is received to said at least first challenge issued.

19. The process according to claim 18, wherein said detecting step further comprises the step of:
if said any variances are found, applying, using a business policies engine, one or more policies for handling said any variances that are found, such that said at least first challenge issued corresponds to said risk level identified for said at least one electronic service request received in light of said any variances found.

20. The process according to claim 19, wherein said user-preset challenge group comprises one or more static challenges that are preset by said user; and wherein said customer relationship management challenge group comprises one or more dynamic challenges that are generated using a customer relationship management system.

21. The process according to claim 20, wherein as said risk level identified for said at least one electronic service request received increases, a level of complexity associated with said challenge issued to said user for said at least one electronic service request received increases.

22. The process according to claim 18, further comprising:
determining if a variance has occurred, wherein a variance is an unusual present user behavior, compared with typical past user behavior, that is exhibited by said user when requesting access to said at least one electronic service; and
issuing said static challenge or said dynamic challenge based on characteristics of any variances found, any business rules and policies that are applicable, and an assessment of risk level for said at least one electronic service requested.

* * * * *